(12) United States Patent
Schulenberg (10) Patent No.: US 9,650,062 B2
(45) Date of Patent: May 16, 2017

(54) SYSTEM FOR CONTROLLING REMOTE OPERATION OF GROUND WORKING DEVICES

(71) Applicant: Wacker Neuson Production Americas LLC, Menomonee Falls, WI (US)

(72) Inventor: David J. Schulenberg, Kewaskum, WI (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 109 days.

(21) Appl. No.: 13/975,677

(22) Filed: Aug. 26, 2013

(65) Prior Publication Data

US 2015/0054629 A1    Feb. 26, 2015

(51) Int. Cl.
*G08C 17/02*    (2006.01)
*B62B 5/00*    (2006.01)
(Continued)

(52) U.S. Cl.
CPC .......... *B62B 5/0076* (2013.01); *E01C 19/002* (2013.01); *E02F 9/205* (2013.01);
(Continued)

(58) Field of Classification Search
CPC ...... B62D 51/002; B62D 55/26; B62D 57/02; B62D 5/0418; E02D 3/02; E02D 3/046;
(Continued)

(56) References Cited

U.S. PATENT DOCUMENTS 5,415,494 A    5/1995    Steffen
5,450,068 A    9/1995    Steffen
(Continued)

FOREIGN PATENT DOCUMENTS

DE    42 21 796 C1    2/1994
DE    20 2004 015 141 U1    1/2005
(Continued)

OTHER PUBLICATIONS

Extended European search report (EESR) and the European search opinion: European Patent Application No. 14002382.1; Dated Jan. 21, 2015—(9) pages.
(Continued)

*Primary Examiner* — Steven Lim
*Assistant Examiner* — Mancil Littlejohn, Jr.
(74) *Attorney, Agent, or Firm* — Boyle Fredrickson, SC (57) ABSTRACT

A system for controlling operation of a ground treatment machine includes a hand-held device that wirelessly communicates with the ground treatment machine. The system includes a radio frequency and an infrared frequency wireless communications that are established between the hand-held device and the ground treatment machine. Instructions associated with operation of the machine are communicated to the machine from the hand-held device via the radio frequency communications. A status of the infrared wireless communication is utilized to assess the proximity of the ground working machine relative to the operator and the operating environment such that operation of the machine in accordance with the operational instructions can be interrupted if necessary.

20 Claims, 2 Drawing Sheets

(51) Int. Cl.
*E01C 19/00* (2006.01)
*G08C 23/04* (2006.01)
*E02F 9/20* (2006.01)
*G08C 25/00* (2006.01)

(52) U.S. Cl.
CPC .............. G08C 17/02 (2013.01); G08C 23/04 (2013.01); G08C 25/00 (2013.01); *G08C 2201/10* (2013.01); *G08C 2201/71* (2013.01); *G08C 2201/91* (2013.01)

(58) Field of Classification Search
CPC ......... E02D 3/026; E02D 1/022; E02D 1/025; E02D 1/027; E02D 3/032; E02D 3/12; E02D 1/00; E02D 27/26; E02D 27/28; E02D 3/054; E02D 5/46; E02D 5/62; G08C 17/02; G08C 23/04; B62B 5/0076; E01C 19/002
USPC .......... 340/12.3, 12.22, 12.24, 12.27, 12.37, 340/12.5, 12.53, 13.2, 13.22, 4, 13.25, 340/13.27, 13.28; 404/75, 128, 84.1, 117, 404/113; 180/20, 167, 9.32
See application file for complete search history.

(56) References Cited

U.S. PATENT DOCUMENTS

| | | | |
|---|---|---|---|
| 5,802,467 A * | 9/1998 | Salazar | H04B 10/1149 340/12.3 |
| 5,942,679 A | 8/1999 | Sandstrom | |
| 6,285,925 B1 | 9/2001 | Steffen | |
| 6,619,125 B2 | 9/2003 | Laugwitz | |
| 6,871,712 B2 * | 3/2005 | Koch | E21B 7/046 175/103 |
| 3,664,315 A1 | 2/2006 | Steffen | |
| 6,997,648 B2 | 2/2006 | Steffen | |
| 7,491,014 B2 | 2/2009 | Sick | |
| 7,657,492 B2 * | 2/2010 | Rieger et al. | 706/11 |
| 8,115,650 B2 | 2/2012 | Dasilva et al. | |
| 2002/0003990 A1 | 1/2002 | Laugwitz | |
| 2008/0208395 A1 | 8/2008 | Self et al. | |
| 2008/0303707 A1 * | 12/2008 | Larsen | G08C 23/04 341/176 |
| 2012/0134746 A1 | 5/2012 | Wallrath et al. | |

FOREIGN PATENT DOCUMENTS

| | | | | |
|---|---|---|---|---|
| DE | 202006012632 U1 | 1/2007 | | |
| DE | 102010014902 A1 | 11/2010 | | |
| DE | 102011107091 A1 | 1/2013 | | |
| DE | WO 2013007329 A1 * | 1/2013 | ............ | E01C 19/004 |
| EP | 945838 A1 * | 9/1999 | ............ | G08C 17/02 |
| EP | 0945838 A1 | 9/1999 | | |
| EP | 2 4558 089 A2 | 11/2011 | | |
| WO | WO 2013007329 * | 1/2013 | ............ | G08C 17/02 |
| WO | WO 2013007329 A1 * | 1/2013 | ............ | G08C 17/02 |

OTHER PUBLICATIONS

EPO Communication of a notice of opposition dated Mar. 16, 2017; Applicant—Wacker Neuson Production Americas LLC; Application No./Patent No. 14002382.1-1857/2843637-(1) page.

* cited by examiner

SYSTEM FOR CONTROLLING REMOTE OPERATION OF GROUND WORKING DEVICES

BACKGROUND OF THE INVENTION

1. Field of the Invention

The invention relates to a system for providing remote control of ground treatment or working devices, such as self-powered ground-compaction devices. The system includes a hand-held device that wirelessly communicates with the ground working device via two different frequency communication protocols such that the system enhances the control associated with operation of the ground treatment via an operator that is proximate but remote therefrom.

2. Description of the Related Art

One way of remotely controlling ground working devices is to provide a cable connection between the working device and a transmitter associated with a remote control device. Several wires are commonly accommodated in the cable connection and tether the remote control device to the working device such that the operator can control operation of the working device from locations slightly remove by still very proximate to the working device. The cable connection serves to transmit control commands from the transmitter of the remote control device to the working device. The transmitter is commonly supplied with power from the working device via the cable connection. Such a configuration provides continuous communication between control and working devices but commonly requires close proximity between the operator and the working device wherein the range of this proximity is controlled by the length of the cable connection that extends therebetween.

Commonly, the length of the cable connection is configured to prevent certain interaction between the operator, the working environment, and the working device. For instance, the cable connection is commonly configured to define a designated operating area associated with the position or location of the operator relative to the working device. The length of the cable connection is commonly dimensioned such that the operator is unable to enter the travel path associated with movement of the working device. Such systems also commonly include one or more safety devices, such as protective bars, pressure bars, limit switches, or the like which interfere with operation of the working device or even reverse the direction of travel of the working device if the operator comes into contact with a respective safety device. Such safety devices are however susceptible to damage and/or inoperability when the working device is operated in close proximity to other devices and/or structures associated with the working environment. For instance, respective brackets associated with such safety devices can be bent or torn from the working device effectively rendering the safety device inoperable or ill-suited to suspend or otherwise interfere with operation of the working device when desired, anticipated, or expected.

A further disadvantage of such remote cable control is attributable to the restrictive length of the cable which forces the operator to constantly follow the working device to maintain the necessary proximity thereto. Such a configuration leaves the operator continuously exposed to noise, exhaust gases, vibrations, etc. commonly associated with operation of working device, other devices or machines that may be operating in the vicinity, and other dirt and uneven terrain common to such environments.

To obviate one or more of the aforementioned disadvantages, others have implemented ground treatment machines having remote control devices which operate via an infrared communication protocol. Such wireless communication interfaces provide a modulated infrared light that is communicated between a transmitting unit and a receiving unit that are associated with one of the control device and the working device. Such infrared remote control systems commonly require a constant visual or line-of-sight communication interface between the control device and the working device. If the operator fails to maintain the line-of-sight proximity, such as can occur should the operator stumble or fall or other structures or devices interfere with the line-of-sight communication, the infrared signal is interrupted resulting in suspension of operation of the working device.

DE 42 21 793 C1 discloses one such infrared remote control for a ground-compaction device and implements a control device that is carried by the operator. The control device transmits not only the infrared communication providing for the functional control of the working device but also a short-range infrared radiation communication at a substantially lower intensity than the radiation associated with the infrared control radiation communication. This short-range radiation can only be received with sufficient intensity in the immediate area surrounding the transmitter.

Upon reception of the short-range radiation, indicating a close proximity of the working device to the control device—and thereby the operator, the receiving unit associated with the working device suppresses the generation of electrical signals caused by receipt of the control radiation so as to suspend operation of the working device if such proximity occurs. That is, the infrared remote control system of DE 42 21 793 C1 allows operation of the working device provided the working device is located within a receiving range of the control radiation but outside the range of the short-range radiation communication. If the distance between the operator and the working device is less than a predetermined distance, i.e. if the short-range radiation is received by the receiving unit associated with the working device, operation of the working device is suspended. The short-range radiation signal provides a wireless proximity safety device whose purpose is similar to the physical safety devices as described above.

One disadvantage of such infrared control systems is the substantial amount of power that is required to generate and maintain the signals associated with the modulated and short-range infrared communications. Operator support of that part of the power system associate with the remote control device, and the power source necessary thereto, can accelerate operator fatigue and limits the duration of operation of the system between recharges or replacements of the power source. Further, incidence of insufficient battery power associated with either operation of the transmitter or receiver of the infrared wireless communication can lead to adverse interruptions in operation of the working device and/or control system.

DE 41 39 041 A1 describes a remote control device which can be operated both as a wired and wireless system. A detector establishes whether a signal transmission cable is connected to the device, and outputs a corresponding signal to switch the device between the hardwired and wireless operating systems. During the wire-connection operation, the control signals are transmitted via the cable which connects a transmitter to a receiver. In addition, the cable serves to supply power to the transmitter. Such a system is susceptible to the one or more of the drawbacks discussed above with respect to the discrete wired or wireless control of the working device.

U.S. Pat. Nos. 5,450,068 and 6,997,648, the disclosures of both of which are attributable to the commercial efforts of the present applicant and which are incorporated herein, disclose remote control systems for remotely controlled operation of ground treatment devices that overcome one or more of the drawbacks discussed above. U.S. Pat. No. 6,997,648 discloses a remote control device that includes a transmitter unit which can be actuated by a user and which is used to transmit control signals in the form of electromagnetic radiation. A receiver unit is arranged on the working device and outputs the received control signals in the form of electronic control commands to the control unit of a working device.

During operation of the working device, the transmitter unit can be connected to an external power source, which is arranged on the working device, via a cable for the supply of power thereto. Such a configuration allows reliable operation of the control system for lengthy operating periods without compromise to efficient transmission of control signals at high transmission power. However, it is believed room exists for improving the efficient and reliable wireless communication between a remote operator control and a working device in a manner that does not detrimentally affect operator or other personnel safety and which better accommodates interferences associated with the operating environment.

SUMMARY OF THE INVENTION

The present invention provides a system and method for remotely controlling operation of a ground working device or machine that overcomes one or more of the drawbacks discussed above. One aspect of the invention discloses a system that includes a hand-held device that wirelessly communicates with the ground treatment machine. The system includes an omni-directional long range frequency, such as a radio frequency, and a more directional signal frequency, such as an infrared frequency, wireless communications that are established between the hand-held device and the ground treatment machine. Instructions associated with operation of the machine are communicated to the machine from the hand-held device via the radio frequency communications. A status of the infrared wireless communication is utilized to assess the proximity of the ground working machine to the operator and the operating environment such that operation of the machine in accordance with the operational instructions can be interrupted if necessary.

Another aspect of the invention discloses a system for controlling remote operation of a ground compaction device. The system includes a hand-held device that remotely communicates with the ground compaction device. A first transmitter and a first receiver provide an omni-directional long range frequency, such as a radio wavelength, wireless communication between the hand-held device and the ground compaction device. The radio wavelength communication communicates operational control commands to the ground compaction device from instructions provided by a user associated with the hand-held device. The system includes a second transmitter and a second receiver that provide a line-of-sight signal, such as an infrared wavelength signal, wireless communication between the hand-held device and the ground compaction device such that operation of the ground compaction device in accordance with instructions received via the radio wavelength wireless communication can be suspended as a function of a status of the infrared wavelength wireless communication.

A further aspect of the invention discloses a ground compaction system that includes a ground treatment device and a hand-held controller that is configured to wirelessly communicate with the ground treatment device via both a first wireless communication interface and a second wireless communication interface. The first wireless communication interface is configured to communicate radio wave frequency signals between the hand-held controller and the ground treatment device such that the radio wave frequency signals manipulate operating functions associated with use of the ground treatment device. The second wireless communication interface is configured to communicate infrared frequency signals between the hand-held controller and the ground treatment device to effectuate operation of the ground treatment device according to instructions received via the first wireless communication interface.

Another aspect of the invention discloses a method of controlling operation of a ground compaction device that includes controlling at least one operational function of a ground compaction device with a radio frequency signal that is communicated wirelessly between a hand-held controller and a ground compaction device. An infrared frequency signal is wirelessly communicated between the hand-held controller and the ground compaction device and utilized such that operation of the ground compaction device according to the radio frequency signal can be interrupted and/or suspended when the infrared frequency signal is interrupted for a duration defined by a threshold.

In a preferred aspect, the hand-held device or controlled includes a portable power source associated with generation of the respective radio wave frequency and infrared frequency signals. Preferably, the power source associated with the hand-held device is configured to removably cooperate with a power source of the ground compaction device or cooperate with interchangeable battery or power sources to facilitate recharging of the power source associated with the hand-held device.

In a more preferred aspect the infrared wireless communication includes a short-range signal and a long range signal that can be utilized to define an operating range of the ground working device. The short-range signal is associated with a minimum proximity of the ground working device relative to the operator associated with the hand-held device and the long range signal is utilized to maximum distance between the working device and the hand-held control device. Preferably, the long range infrared frequency signal has a range that is within an operable range of the radio wave frequency control signal. More preferably, the system is configured to tolerate interruptions of the infrared frequency communication signals when the working device is positioned between the short range and long range infrared frequency signals to mitigate nuisance interruptions to the operation of the ground treatment device caused by intermittent obstructions to the infrared communication signals caused by instantaneous movements of the working device, the hand-held device, and structures or machines that may be disposed therebetween.

Preferably, the system is configured to tolerate infrared signal interruptions according to a particular threshold such as for instance less than 10 seconds, less than 5 seconds, or less than approximately 3 seconds. Understandably, such thresholds are merely exemplary and other threshold values or thresholds according to other units, such as a distance between the ground treatment device and the hand-held device may be utilized. Preferably, the system is configured to terminate motion and/or operation of the ground treatment device due to violation of the short and long range infrared signals. It should be appreciated that the short and long range infrared signals can also be tailored to tolerate such intermittent interruptions if suitably calibrated to attain the desired spatial proximity between the hand-held device and the ground treatment device.

These and various other aspects, advantages, and features of the invention will become apparent to those skilled in the art from the following detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
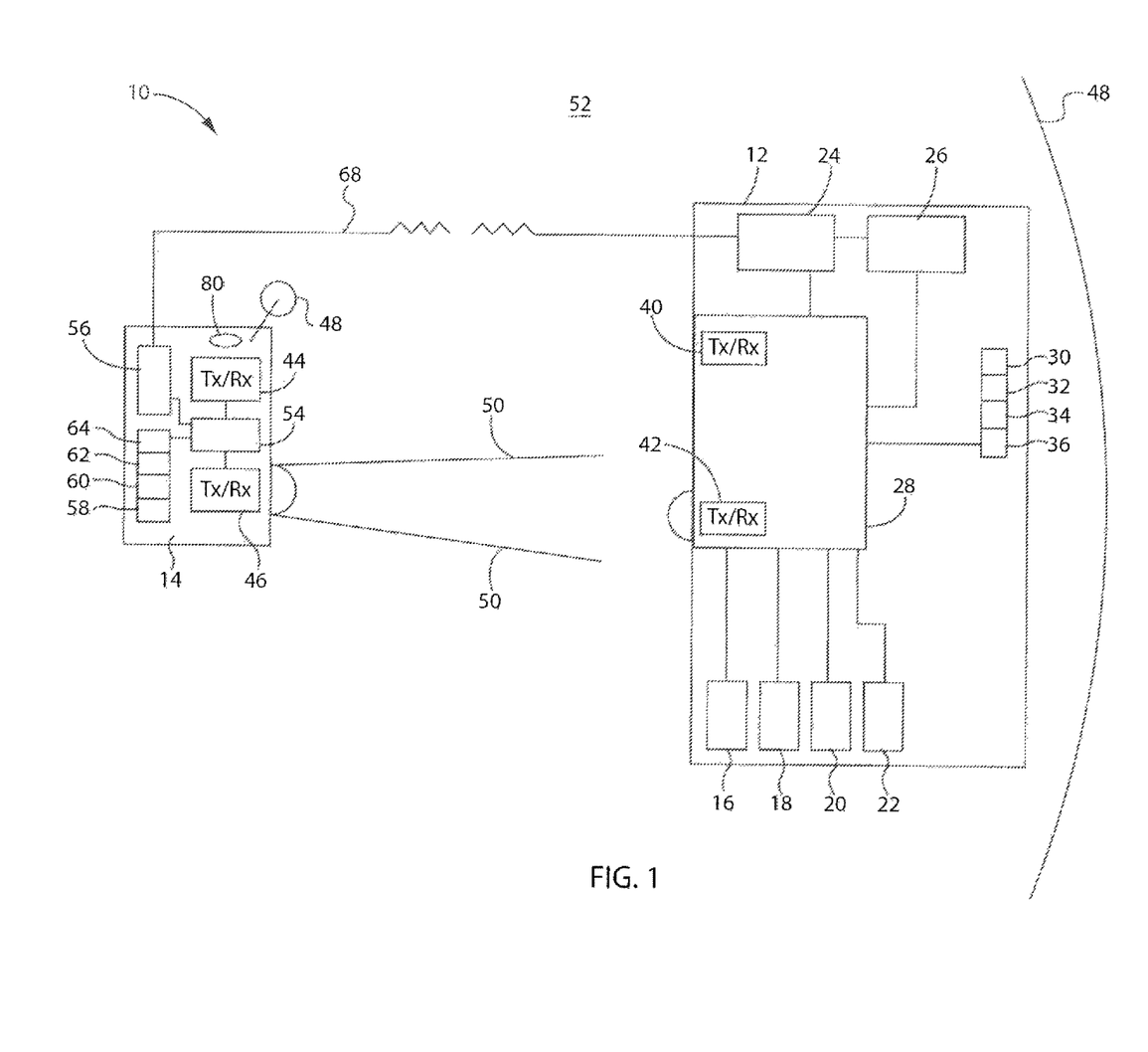
FIG. 1 is a graphical representation of a system for remotely controlling operation of a ground treatment device or machine with a hand-held device or controller according to the present invention.

FIG. 1 shows a control system or simply system 10 that facilitates remote operation of a ground treatment device or machine, such as a ground-compaction roller, vibration plate compactor, or simply compactor 12, via user or operator interaction with a device such as a remote control or hand-held device 14 that is remotely locatable relative to compactor 12. It should be appreciated that such machines commonly include a ground treatment or contacting device or structure such as one or more vibrating or non vibrating plate(s), vibrating or non-vibrating roller(s) or drum(s), blades, etc. that compact the terrain generally beneath the device. One such configuration of compactor 12 is more completely termed an articulated drum type compactor wherein one or more drums rotate to effectuate motion of the compactor and can oscillate or otherwise be excited or counterweighted to vibrate to enhance the degree of compaction associated with movement of the same. Many such machines commonly include a pivotable joint between respective portions associated with supporting the rotatable drums.

As used herein, the term "remote" is used to mean any location that is offset from compactor 12. As explained further below, compactor 12 and hand-held device 14 communicate in such a way as to define an operating range or area wherein instructions from hand-held device 14 effectuate changes to the operation of compactor 12 and in a manner that limits the remote operation of the remotely operated device to a proscribed area that is spatially offset from an area associated with the hand-held device 14, and thereby, the operator associated therewith.

Compactor 12 preferably includes one or more systems associated with operation of the device such as an engine 16, a throttle or speed control 18, a steering control 20, an agitator or exciter control 22, and an electrical signal power source such as a dynamo, alternator, generator, capacitor, and/or battery 24. It is further envisioned that compactor 12 can include an electronic ignition control 26. Compactor 12 can be engine powered battery powered, or combinations thereof. It is further appreciated that changes to the operating conditions associated with the discrete systems of compactor 12 can be effectuated by one or more electrical, mechanical, electro-mechanical, pneumatic, and hydraulic systems associated with generating the desired operation thereof.

Compactor 12 includes a controller 28 associated with manipulating the operation of engine 16, speed control 18, steering control 20, and/or exciter control 22. Compactor 12 includes one or more optional inputs 30, 32, 34, 36 that communicate with one or more of engine 16, speed control 18, steering control 20, exciter control 22, ignition 26, and/or controller 28 to allow operation of compactor 12 via an operator, user, or service personnel located in the immediate proximity of compactor 12.

Controller 28 includes a first wireless communication device or a first transmitter and/or receiver 40 and a second wireless communication device or transmitter and/or receiver 42 that are each configured to respectively wirelessly communicate with a first wireless communication device or transmitter and/or receiver 44 and a second wireless communication device or transmitter and/or receiver 46 associated with hand-held device 14. It is appreciated that transmitters/receivers 44, 46 could be configured to only transmit, only receive, and/or transmit and receive information between hand-held device 14 and compactor 12 and transmitter/receivers 40, 42 of compactor 12 could be configured to only receive information, communication, and/or operating instructions from a respective transmitter 44, 46 associated with hand-held device 14. For brevity, hereinafter wireless communication devices 40, 42 of compactor 12 will be referred to as receivers and the wireless communication devices 44, 46 of hand-held device 14 will be referred to as transmitters as the wireless operational instructions initiated at hand-held device 14 are received at compactor 12 to effectuate or other otherwise manipulate the operation of compactor 12.

Receiver 40 and transmitter 44 are configured to communicate with one another via a first wireless communication interface that communicates via an omni-directional long range frequency signal, such as a radio wave frequency signal or radio wave signal, graphically illustrated by lines 48, whereas receiver 42 and transmitter 46 are configured to communicate with one another via a second wireless communication interface that communicates via a generally more so line-of-sight signal, such as an infrared frequency signal or infrared signal, graphically illustrated by lines 50. It should be understood, radio wave signal 48 provides a generally spheroidal communication area within the broadcast range associated with radio wave signal 48 whereas communication via infrared signal 50 is generally dependent upon a beam or generally line-of-sight proximity between transmitter 46 and receiver 42. As used herein, the term line-of-sight generally defines a beam that originates at a transmitter and increases in width as it progresses away from the transmitter rather than the geometric definition of a line as extending between two geometric points. As further used herein, use of the phrase "long range signal" is indicative of the operating environment and the adjective "long" is used to associate the communicative range between the respective signals associated with each of the first and second wireless communication interfaces. As explained further below with respect to FIG. 2, signals 48, 50 are utilized to define a desired operating range of compactor 12 relative to the operating environment 52 and so as to exclude a suitable area proximate hand-held device 14 to prevent inadvertent contact between an operator and the remotely operated device.

Hand-held device 14 preferably includes controller 54, a power source 56, and one or more inputs 58, 60, 62, 64 associated with communicating user instructions to compactor 12 via the wireless communication between transmitters 44, 46 and receivers 40, 42. It is appreciated that inputs 58, 60, 62, 64 can be provided as any of buttons, switches, joysticks, or other structures which facilitate ergonomic and convenient operator understanding of the manipulation of the respective input relative to the corresponding change associated with operation of compactor 12. It is envisioned that inputs 58, 60, 62, 64 allow remote user interaction and control with any of the systems associated with starting, utilizing, and terminating operation of any of the discrete systems or the entirety of compactor 12.

Power source 56 is connected to controller 54 and/or transmitters 44, 46 for operation of hand-held device 14 and suitable generation of signals 48, 50. It is envisioned that power source 56 can be provided as a battery or the like so as to be interchangeable and/or rechargeable to facilitate extended periods of operation of hand-held device 14. In a preferred embodiment, power source 56 of hand-held device 14 can be removably connected via cable or another suitable conductor 68 such the power source 56 can be recharged via power source 24 of compactor 12. In use, hand-held device 14 is independently remotely positionable relative to compactor 12 such that the wireless communication associated with signals 48, 50 provides only a nonphysical or wireless connection between hand-held device 14 and compactor 12.

Figure 2:
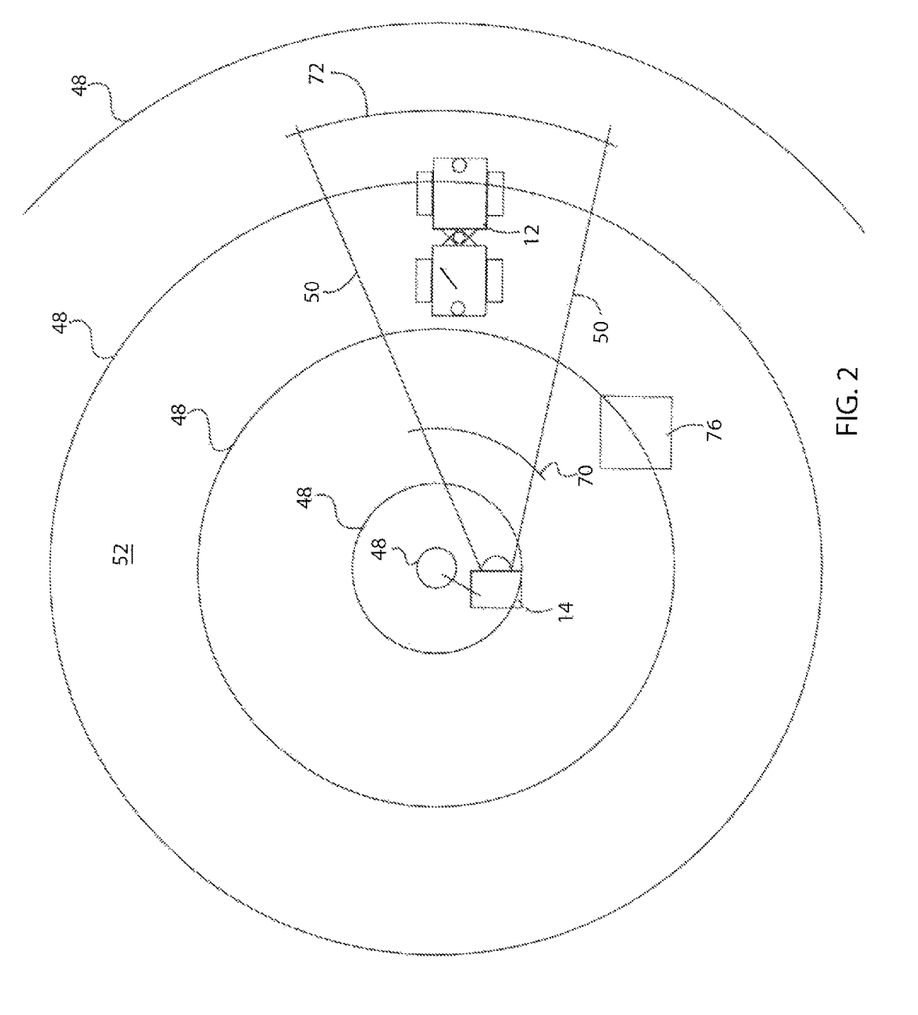
FIG. 2 is a graphical representation of the hand-held controller and ground treatment machine associated with a work environment.

FIG. 2 shows a graphical representation associated with the wireless communication between compactor 12 and hand-held device 14. Input control commands associated with user interaction with inputs 58, 60, 62, 64 are wirelessly communicated to compactor 12 via radio wave signal 48 between transmitter 44 of hand-device 14 and receiver 40 of compactor 12. Only radio wave signal 48 communicates operational instructions to compactor 12. The operational instructions can include instructions related to the starting and stopping of engine 16 via manipulation of ignition control 26, changes to speed control 18, changes to steering control 20, and/or operation of exciter control 22 associated with compaction processes rather than simply movement of compactor 12.

Concurrent with communication of radio wave signal 48, hand-held device 14 communicates with compactor 12 via infrared signal 50. It is appreciated that radio wave signal 48 has a greater operable range than infrared signal 50. Preferably, transmitter 46 is associated with the generation of a short range infrared radiation signal, indicated by line 70, and a long range infrared radiation signal, indicated by line 72. It is further appreciated that the short range infrared radiation signal 70 and long range infrared radiation signal 72 could be provided by discrete transmitters that communicate with receiver 42 and/or discrete receivers associated with compactor 12.

In order to control compactor 12 in a problem-free manner in accordance with the operational instructions communicated via radio wave signal 48, it is necessary for the operator to align hand-held device 14 with compactor 12 such that the infrared radiation signal 50 transmitted by transmitter 46 is directed in the general direction of receiver 42 associated with compactor 12. As disclosed further below however, system 10 will tolerate prescribed intermittent communication connectivity associated with infrared signal 50. As shown in principle by lines 50, 70, 72, which are not to scale, the infrared radiation is transmitted in the form of a directed or line-of-sight beam in such a manner that receiver 42 is located in the radiation range of the infrared beam and preferably receives the infrared radiation.

As alluded to above and as described further below, operation of compactor 12 is dependent upon receipt of signals 48, 50 but system 10 is configured to tolerate intermittent communication of the infrared signal 50 in a manner that proscribes an area of operation of the compactor 12 within a desired proximity to hand-held device 14 without overlapping an area immediately proximate hand-held device 10. Said in another way, the operational instructions of compactor 12 are communicated thereto via radio wave signal 48 but the failure of the infrared signal 50 to satisfy certain conditions allows selective overriding of the instructions associated with radio wave signal 48. Operation of compactor 12 in accordance with the instructions or commands associated with radio wave signal 48 is a function of a status of the infrared signal 50 communication.

Referring to FIGS. 1 and 2, compactor 12 is allowed to operate in accordance with the commands or instructions associated with radio wave signal 48 when compactor 12 is concurrently in communication with hand-held device 14 via infrared signal 50 and has not lost communication associated with long range infrared signal 72. If communication associated with infrared signal 50 between hand-held device 14 and compactor 12 is interrupted, and a communication protocol associated with short range infrared signal 70 has not been violated as explained further below, compactor 12 is preferably allowed to operate in accordance with the instructions received via radio wave signal 48 for a selected duration after interruption of infrared communication signal 50. Such interruptions can occur due to obstructions 76, such as terrain, a structure, a person, or another machine, being disposed between the line-of-sight communication between transmitter 46 and receiver 42.

If communication associated with infrared signal 50 is restored or otherwise reestablished within a desired interval or duration such that a proscribed threshold has not been violated, continued operation of compactor 12 is allowed in accordance with the instructions received via radio wave signal 48. Such a configuration mitigates nuisance shutdowns associated with active or crowded operating environments and/or inexperienced operators. If communication associated with the infrared signal 50 is not reestablished prior to exceeding a respective threshold, operation of compactor 12 in accordance with instructions received via radio wave signal 48 is suspended or otherwise terminated. Such termination can include suspending movement of compactor 12, suspending operation of the compaction action, and/or termination of all operation of compactor 12 including engine function. Preferably, suspension of the operation of compactor 12 is executed in a controlled manner to accommodate subsequent operation of compactor 12 when both radio wave signal 48 and infrared signal 50 communications are reestablished between hand-held device 14 and compactor 12.

One or more of the criteria, and the resulting changes to operation of compactor 12, associated with interruptions to the communications associated with infrared signal 50 can be similar or even the same for obstructions 76 between compactor 12 and hand-held device 14 and communication connectivity failures associated with long-range infrared signal 72. As mentioned above, upon interference of the communication associated with infrared signal 50 between compactor 12 and hand-held device 14, compactor 12 will continue to operate in accordance with the instructions received via radio wave signals 48 until a desired threshold of the interference is exceeded.

It is envisioned that such communication interruption thresholds can be either time-based and/or distance of travel based and associated with continued operation of compactor 12. For example, upon interruption of the communication associated with infrared signal 50, compactor 12 may continue to operate in accordance with the instructions received via radio wave signal 48 for a selected duration of anywhere between 10 seconds and 0.001 seconds. Preferably, the selected duration is nearer between about 5 to about 3 seconds to allow the operator and/or compactor 12 to achieve proximity within the operating environment to reestablish the communication associated with infrared signal 50. Preferably, the delay associated with loss of infrared signal connectively is tailored to mitigate most shutdowns or changes to operation which would be considered nuisance interferences associated with operation of compactor 12. It should be appreciated that such nuisance interferences would be more prevalent were no delay and/or lower delay thresholds, such as 0.001 second or delays of less than approximately 3 seconds provided before initiation of a shutdown sequence due to loss of infrared signal 50.

Understandably, it is further appreciated that suspending operation of compactor 12 could also be configured to accommodate the rate of travel of the compaction device. For instance, it is envisioned that termination of an operating condition can be manipulated to be dynamically responsive to the operating condition associated with the loss of infrared communication such as initiating the shutdown sequence more quickly when the compaction device is traveling at faster operating speeds. Monitoring of the travel speed of compactor 12 can be calculated by either of controllers 28, 54, and/or determined from other sensors associated with monitoring the rate of rotation of a drum associated with compaction rollers when provided in such a configuration.

It is envisioned that loss of the infrared signal 50 communication associated with long-range infrared signal 72 can be similarly configured to tolerate incidental intermittent loss of such communication to allow compactor 12 and/or hand-held device 14 to reach an orientation or proximity to one another wherein compactor 12 is within the operating proximity associated with long-range infrared signal 72. It is further envisioned that the duration associated with the loss of communication of infrared signal 50 associated with long range signal 72 can also be configured to be responsive to a rate of travel of compactor 12 upon the loss of communication. That is, is envisioned that suspension of operation of compactor 12 can be initiated sooner at higher rates of speed of the compactor and later during slower movement of the same. Alternatively, it is envisioned that a long range infrared communication violation can be more instantaneous as is envisioned and explained further below with respect to a short-range infrared communication violation.

Unlike the delayed suspension of operation of compactor 12 caused by intermittent loss of infrared signal 50 communication attributable to obstructions 76 and/or long-range infrared signal 72, it is envisioned that violation of the short range infrared communication 70 results in near immediate suspension of the operation of compactor 12 due at least in large part to the close proximity of compactor 12 relative to hand-held device 14 and the operator associated therewith. Understandably, is appreciated that suspension of operation of compactor 12 due to violation of the short range infrared communication 70 could be provided with a similar distance or time delay as disclosed above were short range infrared communication signal 70 positioned nearer long-range infrared communication signal 72 so as to provide a greater distance between compactor 12 and hand-held device 14 upon violation of short range infrared signal 70.

Preferably, if provided in such a configuration, the delayed shutdown or interference with the operation of compactor 12, regardless of the instructions received via radio wave signal 48, is configured to maintain a desired spatial relationship between compactor 12 and hand-held device 14 upon completion of the operation termination sequence. Such a configuration would allow system 10 to tolerate intermittent violation of the short range infrared communication signal 70 in a manner similar to communications violations associated with obstructions 76 and long range infrared signal 72 as disclosed above. It is appreciated that violation of either of long range or short range infrared communication 70, 72 could be provided as immediate thresholds such that changes in the connectivity associated with either signal could initiate an immediate shutdown rather than providing any delay.

It is further envisioned that hand-held device 14 can include an indicator 80 associated with providing an audible, visual, or tactile indication to the operator of an actual or impending violation of the short range and/or long range infrared signal 70, 72 due to the proximity of compactor 12 to hand-held device 14 and the range associated with long range signal 72. Such a configuration would allow the operator to proactively manipulate their position and/or the position of compactor 12 relative to hand-held device 14, such as reversing a direction of travel of compactor 12, to maintain the required non-violating wireless infrared communication connectivity therebetween.

Communication of the operational instructions from hand-held device 14 to compactor 12 via radio wave signals 48 allows infrared signal 50, 70, 72 to be non-modulated such that infrared signal 50 can be provided as a constant infrared signal that only establishes line of sight rather than communicating operating instructions to compactor 12 as in previous systems. Such a configuration allows the infrared signal 50 to be optimized for long-range communication thereby effectively increasing the operable range associated with the communication between compactor 12 and hand-held device 14 but well within the suitable range of operation associated with radio wave signal 48 while maintaining a desired minimal spacing between the operating compactor 12 and hand-held device 14—and the operator associated therewith. Delaying changes to the operating condition of the compactor 12, when such changes are not in accordance with the instructions received via radio wave signal 48 as disclosed above, allows system 10 to mitigate the detrimental effects of nuisance interferences with the desired operation of compactor 12 while maintaining the desired spatial association of the operator relative thereto.

Preferably, when provided in a drum type compactor configuration, infrared signals 70-72 are associated with distances of approximately 6 feet and 60 feet from remote device 14, respectively. Alternatively, it is envisioned that the reactions associated violations of infrared signals 70, 72 can be associated with travel speeds of approximately 131 ft/min and a corresponding delay associated with the suitable response. Although different delays can be associated with violations associated with signals 50, 70, 72, it is envisioned that system 10 can provide a delay of approximately five seconds in response to communication violations associated with one or more of signals 50, 70, or 72. It is appreciated that the delay, speed, and distances provided above are merely exemplary and that these parameters can be varied to accommodate different conditions associated with movement of the underlying device and/or conditions associated with the operating environment.

Many changes and modifications could be made to the invention without departing from the spirit thereof. The present invention has been described in terms of the preferred embodiment, and it is recognized that equivalents, alternatives, and modifications, aside from those expressly stated, are possible and within the scope of the appending claims.

I claim:

1. A system for controlling remote operation of a ground compaction device, the system comprising:
    a hand-held device that remotely communicates with a ground compaction device;
    a first transmitter and a first receiver that provide a radio wavelength wireless communication between the hand-held device and the ground compaction device, the radio wavelength communication communicating operational control commands to the ground compaction device from instructions provided by a user associated with the hand-held device; and
    a second transmitter and a second receiver that provide an infrared wavelength wireless communication between the hand-held device and the ground compaction device, wherein the infrared wavelength wireless communication does not include operational control commands associated with the radio wavelength wireless communication and such that operation of the ground compaction device is allowed to continue in accordance with instructions received via the radio wavelength wireless communication during interference for a selected duration of the infrared wavelength wireless communication and operation can be suspended as a function of a status of the infrared wavelength wireless communication and the suspension of the operation is dynamically responsive to control commands received upon interference of the infrared wireless communication.

2. The system of claim 1 further comprising a controller configured to assess the status of the infrared wavelength wireless communication and suspend operation of the ground compaction device according to instructions received via the radio wavelength wireless communication if the infrared wavelength wireless communication is interrupted for a predetermined amount of time.

3. The system of claim 2 wherein the predetermined amount of time is one of approximately 10 seconds, approximately 5 seconds, approximately 3 seconds, or approximately 1 second.

4. The system of claim 1 wherein the infrared wavelength communication includes a short range radiation signal that defines a nearest proximity of the hand-held device relative to the ground compaction device and a long range radiation signal that defines a farthest communication proximity of the hand-held device relative to the ground compaction device.

5. The system of claim 1 wherein the operational control commands include an engine operating speed command, a ground compaction device travel speed command, a direction of travel of the ground compaction device command, a steering instructions command, and operation of a compaction exciter command.

6. The system of claim 1 further comprising a power source contained in the hand-held device.

7. The system of claim 6 wherein the power source is rechargeable by a power source of the ground compaction device.

8. A ground compaction system comprising:
    a ground treatment device;
    a hand-held controller configured to wirelessly communicate with the ground treatment device via both a first wireless communication interface and a second wireless communication interface;
    the first wireless communication interface being configured to communicate omni-directional long range frequency signals between the hand-held controller and the ground treatment device, the omni-directional long range signals manipulating operating functions associated with use of the ground treatment device; and
    the second wireless communication interface being configured to communicate
    signals at a different frequency and within a range associated with communication via the omni-directional long range frequency signals between the hand-held controller and the ground treatment device to allow operation of the ground treatment device according to instructions received only via the first wireless communication interface within the range associated with communication via the first wireless communication interface and the second wireless communication device and suspend operation of the ground treatment device due to interruption of the second wireless communication interface; and the suspension is a function of the operating instructions received via the first wireless communication interface upon interruption of the signal associated with the second wireless communication interface.

9. The ground compaction system of claim 8 further comprising a threshold associated with the second wireless communication interface wherein the threshold defines a period of operation of the ground treatment according to instructions received via the first wireless communication interface when communication between the hand-held controller and the ground treatment device via the second wireless communication is interrupted.

10. The ground compaction system of claim 9 wherein the period is less than 10 seconds.

11. The ground compaction system of claim 9 wherein the period is less than 3 seconds.

12. The ground compaction system of claim 9 wherein the threshold is determined as a function of a travel speed of the ground treatment device when interruption of the second wireless communication occurs.

13. The ground compaction system of claim 8 wherein each of the first wireless communication interface and the second wireless communication interface include at least one transmitter and at least one receiver and at least one of the transmitter and receiver of the first wireless communication interface and second wireless communication interface, respectively, is associated with the hand-held controller and the other of the at least one of the transmitter and the receiver of the first wireless communication interface and the second wireless communication interface, respectively, is associated with the ground treatment device.

14. The ground compaction system of claim 8 wherein the second wireless communication interface includes a short range infrared signal and a long range infrared signal, the short range infrared signal defining a nearest proximity between the hand-held controller and the ground treatment device associated with operation of the ground treatment device according to instructions received via the first wireless communication interface, the long range infrared signal defining a farthest proximity between the hand-held controller and the ground treatment device associated with operation of the ground treatment device according to instructions received via the first wireless communication interface.

15. A method of controlling operation of a ground compaction device, the method comprising:
controlling at least one operational function of a ground compaction device with
an omni-directional long range frequency signal that is communicated wirelessly between a hand-held controller and a ground compaction device;
wirelessly communicating an infrared frequency signal between the hand-held controller and the ground compaction device; and
maintaining operation of the ground compaction device according to instructions received via the omni-directional long range frequency signal during interruption of the infrared frequency signal and suspending operation of the ground compaction device according to the omni-directional frequency signal when the infrared frequency signal is interrupted for a duration defined by a threshold and the suspension of operation is dynamically responsive to an operating condition of the ground compaction device associated with the interruption of the infrared signal.

16. The method of claim 15 further comprising associating an upper location proximity threshold and a lower location proximity threshold as determined by a distance between the hand-held controller and the ground compaction device with the infrared frequency signal.

17. The method of claim 15 further comprising defining the duration as less than 10 seconds associated with interruption of the infrared frequency signal.

18. The method of claim 15 further comprising defining the duration as less than or equal to 3 seconds.

19. The method of claim 15 wherein the at least one operational function includes at least one of a direction of travel of the ground compaction device, a steering function, operation of an engine, and operation of an exciter of the ground compaction device.

20. The method of claim 15 wherein interrupting operation of the ground compaction device includes at least one of changing an engine operating condition, manipulating a direction of travel of the ground compaction device, manipulating a travel speed of the ground compaction device, and manipulating operation of an exciter of the ground compaction device.

* * * * *